United States Patent
Maiman et al.

(10) Patent No.: US 12,067,564 B2
(45) Date of Patent: *Aug. 20, 2024

(54) USING AN ALWAYS ON LISTENING DEVICE SKILL TO RELAY ANSWERS TO TRANSACTION-BASED KNOWLEDGE-BASED AUTHENTICATIONS

(71) Applicant: Capital One Services, LLC, McLean, VA (US)

(72) Inventors: Tyler Maiman, Melville, NY (US); Daniel Miller, Brooklyn, NY (US); Jenny Melendez, Falls Church, VA (US); Viraj Chaudhary, Katy, TX (US); David Septimus, New York, NY (US); Joshua Edwards, Philadelphia, PA (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,709

(22) Filed: Sep. 6, 2023

(65) Prior Publication Data
US 2024/0070669 A1 Feb. 29, 2024

Related U.S. Application Data

(63) Continuation of application No. 17/540,489, filed on Dec. 2, 2021, now Pat. No. 11,783,334.

(51) Int. Cl.
| | |
|---|---|
| G06Q 20/40 | (2012.01) |
| G06F 21/32 | (2013.01) |
| G10L 17/24 | (2013.01) |

(52) U.S. Cl.
CPC ......... *G06Q 20/4014* (2013.01); *G06F 21/32* (2013.01); *G06Q 20/4016* (2013.01); *G10L 17/24* (2013.01)

(58) Field of Classification Search
CPC ............ G06Q 20/4014; G06Q 20/4016; G06F 21/32; G10L 17/24
See application file for complete search history.

(56) References Cited

U.S. PATENT DOCUMENTS

| | | | |
|---|---|---|---|
| 8,447,700 | B2 | 5/2013 | Yuen et al. |
| 10,074,089 | B1 * | 9/2018 | Rangaraj .......... G06Q 20/40145 |

(Continued)

FOREIGN PATENT DOCUMENTS

| | | |
|---|---|---|
| CN | 109428719 A | 3/2019 |
| EP | 2784710 A2 | 10/2014 |
| EP | 3502938 A1 | 6/2019 |

OTHER PUBLICATIONS

Mar. 27, 2023 (WO) International Search Report and Written Opinion—App PCT/US2022/051140, 31 pages.

*Primary Examiner* — Bruce I Ebersman
*Assistant Examiner* — Matthew Cobb
(74) *Attorney, Agent, or Firm* — Banner & Witcoff, Ltd.

(57) ABSTRACT

Aspects discussed herein may relate to techniques for authenticating a user using transaction-based authentication questions. The transaction-based authentication questions may be provided to the user. The user may provide audible responses to the transaction-based authentication questions that may be captured by a smart device, such as an always on listening device. Authentication of the user may be based on voice analysis of the audible responses to the transaction-based authentication questions and/or based on the answers to the transaction-based authentication questions.

20 Claims, 5 Drawing Sheets

(56) References Cited

U.S. PATENT DOCUMENTS

| | | | | |
|---|---|---|---|---|
| 2006/0286969 | A1* | 12/2006 | Talmor | G06F 21/32 |
| | | | | 379/142.01 |
| 2006/0292539 | A1* | 12/2006 | Jung | G09B 7/06 |
| | | | | 434/322 |
| 2014/0003636 | A1* | 1/2014 | Bodvarsson | H04R 5/033 |
| | | | | 381/311 |
| 2022/0335433 | A1* | 10/2022 | Rapowitz | G06Q 20/40145 |

* cited by examiner

USING AN ALWAYS ON LISTENING DEVICE SKILL TO RELAY ANSWERS TO TRANSACTION-BASED KNOWLEDGE-BASED AUTHENTICATIONS

CROSS-REFERENCE TO RELATED APPLICATION

This application is a continuation of U.S. patent application Ser. No. 17/540,489, filed on Dec. 2, 2021, which is entitled "Using an Always on Listening Device Skill to Relay Answers to Transaction-Based Knowledge-Based Authentications" which application is incorporated by reference herein in its entirety.

FIELD OF USE

Aspects of the disclosure relate generally to authenticating a user. More specifically, aspects of the disclosure provide techniques for using a smart device to enhance the security and reliability of user authentication.

BACKGROUND

Financial accounts may be maintained by a financial institution. A user may be required to be authenticated in order to grant a request from the user to access sensitive information or to perform a financial transaction associated with the financial account. Some conventional systems for authenticating a user may require the user to answer a basic personal question such as, for example, identifying the maiden name of the user's mother. Such basic personal questions may be easily circumvented by a malicious actor that gains access to such information. Other conventional systems for authenticating a user may require a user to provide a voice sample of a predetermined phrase which is then compared to a stored recording of the same predetermined phrase known to be provided from an authorized user. These conventional systems are also easily circumvented by a malicious actor that obtains a recording of the user uttering the predetermined phrase. As such, authentication processes provided by these conventional systems may be easily compromised and the malicious actor may be mistakenly granted access to the financial account, thereby frustrating the purpose of the authentication process and rendering the financial account vulnerable to fraudulent activity.

Aspects described herein may address these and other problems, and generally enable a user to be verified in a more reliable and robust manner, thereby improving the integrity of the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide techniques for authenticating a user using a smart device (e.g., a listening device or an always on listening device). The smart device may be configured to interact with a computing device associated with a financial institution. The user may have one or more financial accounts with the financial institution. The computing device associated with a financial institution may generate financial transaction-based authentication questions that may be presented to the user. The smart device may relay audible responses to financial transaction-based authentication questions from the user to the computing device associated with a financial institution. A voice print of the user obtained from the audible responses may be compared to an expected or known voice print of the user. Requirements for the user to answer the financial transaction-based authentication questions correctly may be modified based on the results of the voice print comparisons. If the voice prints match, fewer financial transaction-based authentication questions may be presented to the user and/or fewer correct answers to the financial transaction-based authentication questions may be required for authentication. If the voice prints do not match, more financial transaction-based authentication questions may be presented to the user and/or more correct answers to the financial transaction-based authentication questions may be required for authentication. By combining voice print analysis with the financial transaction-based authentication question process, the security and integrity of the authentication process is improved. Further, the user may be required to provide responses to relatively fewer financial transaction-based authentication questions in order to be authenticated, thereby improving the experience of the user during the authentication process.

Aspects described herein may provide techniques for receiving a request for authorization to perform an action relating to a financial account. Financial transaction data relating to the financial account for a predetermined period of time may then be received from one or more databases. One or more (e.g., a set) authorization questions for determining whether to perform the action relating to the financial account may be generated based on the financial transaction data. One or more (e.g., a set) corresponding correct answers to the one or more authorization questions may be generated based on the financial transaction data. The one or more authorization questions may be provided to the user. The user may provide audible or verbal responses to the one or more authorization questions. The audible or verbal responses to the one or more authorization questions may be captured by a smart device (e.g., a listening device or an always on listening device). The audible or verbal responses to the one or more authorization questions may be received via the smart device. A voice print of the user may be determined based on the audible responses to the one or more authorization questions. The determined voice print of the user may be compared to an expected voice print of the user. A determination may then be made whether to grant the request for authorization to perform the action relating to the financial account based on the comparison of the determined voice print of the user to the expected voice print of the user and based on the audible responses to the one or more authorization questions. For example, the user may be authenticated based on the user the determined voice print matching the expected voice print and/or the user providing one or more correct answers to the corresponding one or more authorization questions. By combining voice print analysis with authentication question processes, the overall authentication process is less likely to be circumvented by a malicious actor. In turn, the authentication process is more reliable and less susceptible to fraudulent activity that could be caused by erroneously granting the malicious actor access to the financial account.

Aspects described herein may provide a computer-implemented method for authenticating a user using a smart device. Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
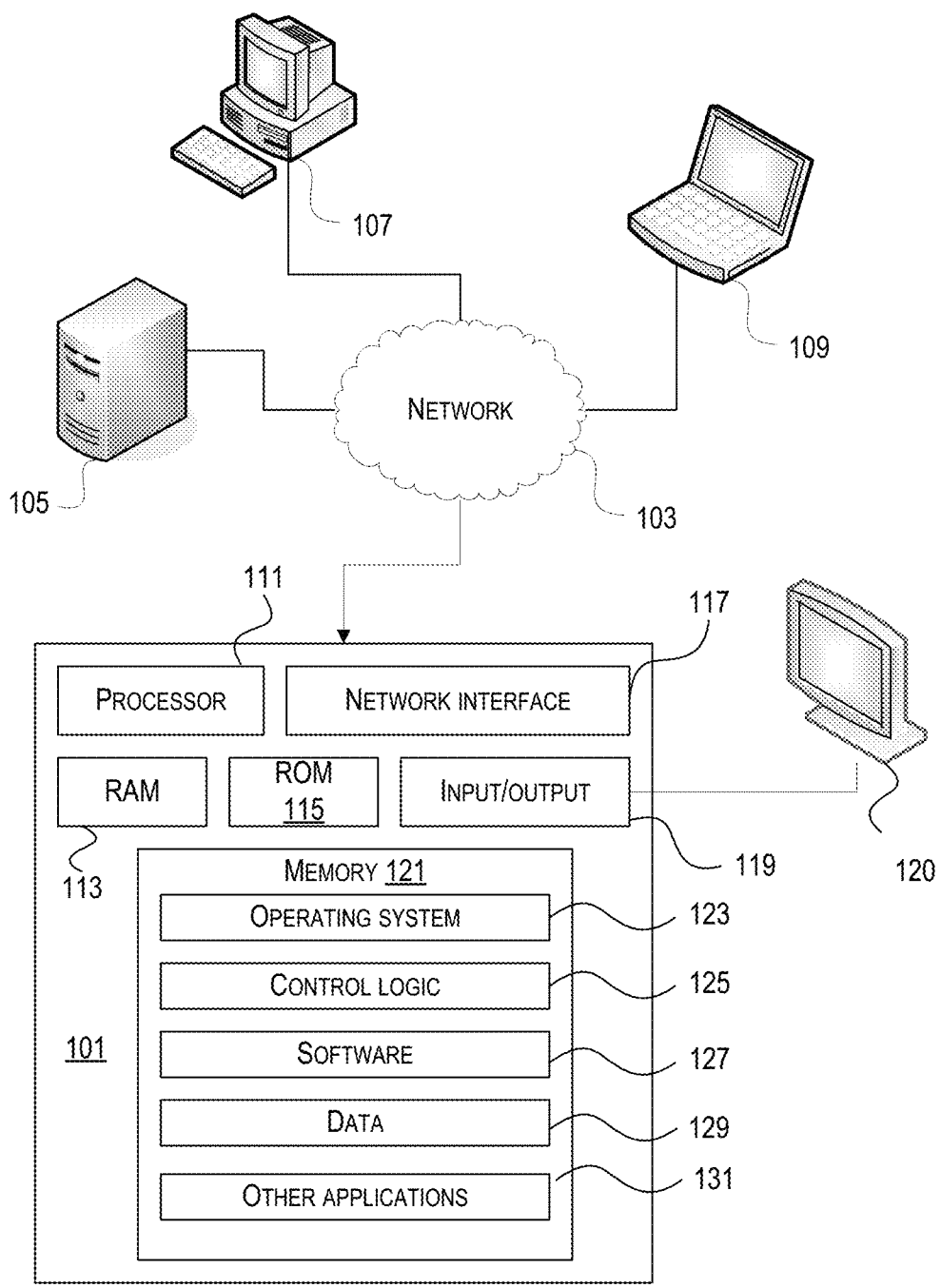
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for authenticating a user. A user may be authenticated using transaction-based authentication questions (e.g., knowledge-based authentication (KBA)). The user may provide audible responses to the transaction-based authentication questions. A smart device (e.g., a listening device or an always on listening device) may receive the audible responses to the transaction-based authentication questions. A voice analysis of the audible responses may be performed, to initially determine if the audible responses were provided by an authorized user. If it is determined that it is likely that the authorized user provided the audible responses, then the smart device may relay the audible responses for analysis to determine if the user provided correct answers to the transaction-based authentication questions. If it is determined that the user provided correct answers to the transaction-based authentication questions, then the user may be authenticated. By combining voice analysis with analysis of the answers to the transaction-based authentication questions, the robustness of the authentication process is improved. Further, by basing the voice analysis on responses to dynamic transaction-based authentication questions, a risk of circumvention of the voice analysis process is significantly reduced.

Aspects described herein improve the functioning of computers by improving the way in which computing devices authenticate a user. Conventional computing devices implementing conventional techniques for authenticating a user might not consider the risk of basing authentication on non-financial transaction-based authentication questions, or the risk of basing authentication on static voice sample utterances (e.g., predetermined words or phrases). A malicious actor that obtains access to a user's basic personal information (e.g., mother's maiden name, or high school mascot) may be able to easily correctly answer non-financial transaction-based authentication questions. Further, a malicious actor that obtains access to a recoding of the user voicing a predetermined word or phrase may be able to easily circumvent voice security processes. As a result, the malicious actor may be authorized by mistake, making a financial account vulnerable to fraudulent activity. Significant time and energy must then be expended to deal with the fallout of fraudulent activity related to the financial account. By providing improved authorization techniques—for example, by performing voice analysis based on actual audible answers to the financial transaction-based authentication questions—authorization may be conducted more accurately and efficiently with lower risk that a malicious actor is mistakenly granted authorization. Over time, the processes described herein may save processing time, network bandwidth, and other computing resources. Moreover, such improvement cannot be performed by a human being with the level of accuracy obtainable by computer-implemented techniques to ensure accurate authentication of a user and improved detection of a malicious actor.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may implement one or more aspects of the disclosure by reading and/or executing instructions and performing one or more actions based on the instructions. The computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown)

may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various examples for using a listening device to relay answers to transaction-based knowledge-based authentication (KBA) questions.

Figure 2:
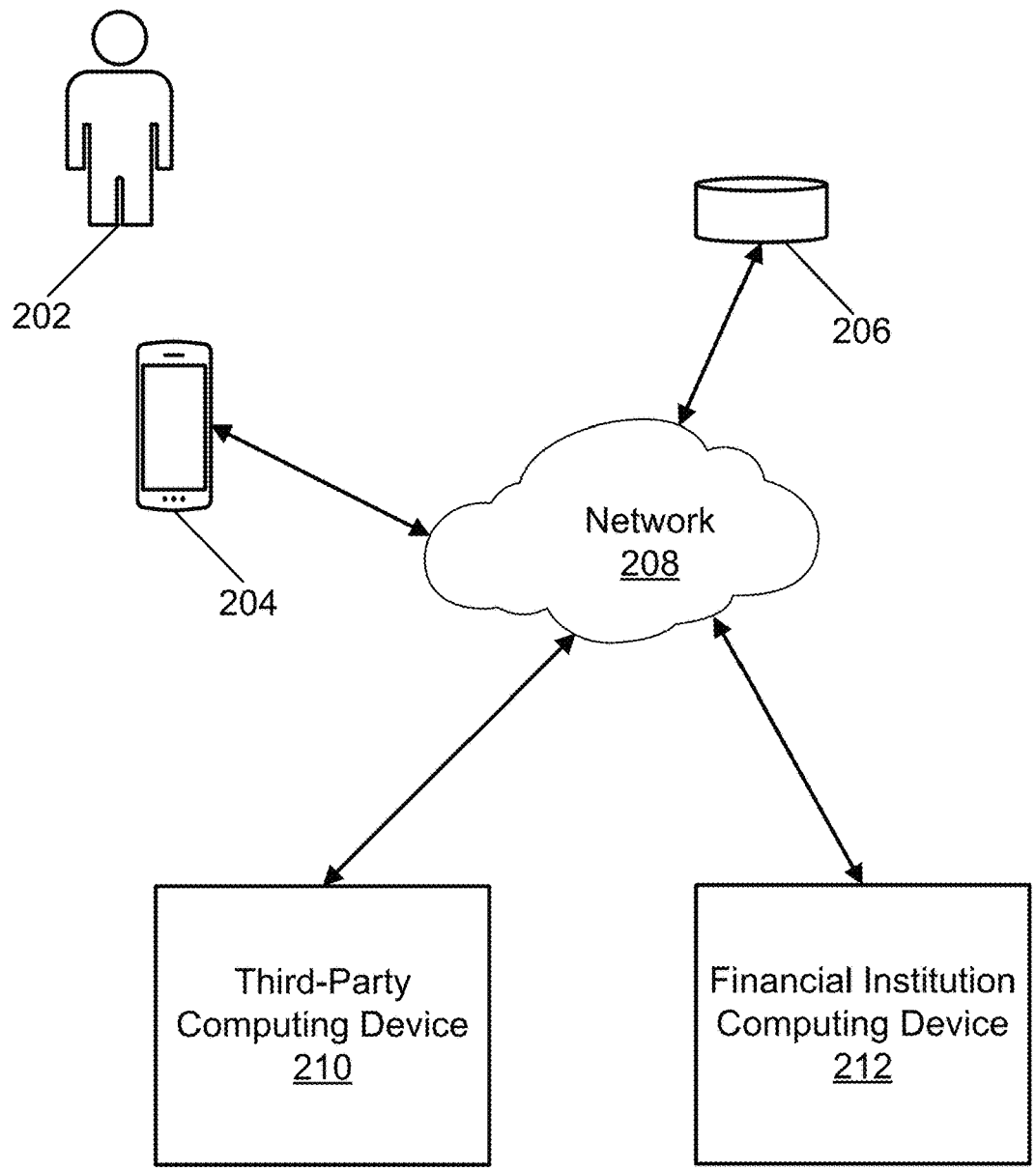
FIG. 2 illustrates an operating environment in which transaction-based authentication questions may be relayed by a smart device.

FIG. 2 illustrates an operating environment 200 in which answers to transaction-based KBA questions may be relayed. As shown in FIG. 2, the operating environment 200 may include a user 202, a user computing device 204, a smart device 206, a network 208, a third-party computing device 210, and a financial institution computing device 212.

The user 202 may be any individual or may represent a legal entity. The user computing device 204 may be any type of computing device, including any computing device depicted and described in relation to FIG. 1. The user computing device 204 may be, for example, a smartphone, a laptop, or a tablet. The user computing device 204 may be a wireless device such as, for example, a portable wireless computing device.

The user computing device 204 may be associated with the user 202. The user 202 may use the user computing device 204 to access secure or sensitive information associated with a financial account. The user 202 may use the user computing device 204 to request performance of a transaction associated with a financial account. The user 202 may be or might not be authorized to access sensitive information associated with a financial account. The user 202 may be or might not be authorized to issue a request to conduct a transaction associated with the financial account. As an example, the user 202 may be the true-named-person of the financial account (e.g., the user 202 may or might not be an owner, an authorized user, or an account holder of the financial account subject to a request). As another example, the user 202 may be a malicious actor intending to gain unauthorized access to a financial account.

The smart device 206 may be any type of computing device. The smart device 206 may be any type of smart device (e.g., a home or office smart device) capable of responding to user inputs (e.g., voice commands or questions) and/or capable of controlling or interacting with one or more other networked devices. In various embodiments, the smart device 206 may be a listening device. For purposes of discussion, the smart device 206 may be referred to as listening device 206. The listening device 206 may be any type of listening device. The listening device 206 may be an always on listening device. The listening device 206 may be, for example, a GOOGLE HOME HUB, a GOOGLE NEST HUB, an AMAZON ECHO device, a SAMSUNG SMARTTHINGS HUB, or an APPLE HOMEPOD, or any other type of smart home device or hub. In general, the listening device 206 may be any type of smart home device or hub that is capable of responding to voice inputs (e.g., commands or questions) from the user 202. In general, the listening device 206 may be any type of listening device and may be used to control one or more devices within any type of environment. The listening device 206 may include any voice skill (e.g., ALEXA skill, GOOGLE HOME skill, or SIRI) to announce audible information, receive audible information, and to relay audible information to the third-party computing device 210 or the financial institution computing device 212. A skill of the listening device 206 may include any of these capabilities including the capability to determine whether a voice sample of the user matches an expected voice print of the user 202. Further, the listening device 206 may be configured with a skill to relay (e.g., announce) transaction-based questions provided by the financial institution computing device 212.

The network 208 may be any type of communications and/or computer network. The network 208 may include any type of communication mediums and/or may be based on any type of communication standards or protocols. The network 208 may be the same or similar to the network 103 of FIG. 1. The network 208 may include one or more LANs, PANs, or wide area networks (WANs). The network 208 enables data or other information to be shared among the user computing device 204, the listening device 206, the third-party computing device 210, and the financial institution computing device 212. The network 208 may communicatively couple any of the devices or components depicted in FIG. 2 with any other depicted device or component.

The third-party computing device 210 may be any type of computing device including any computing device depicted and described in relation to FIG. 1. The third-party computing device 210 may be associated with any third-party company, institution, or service. For example, the third-party computing device 210 might be a server associated with a particular third-party company. The third-party computing device 210 may represent one or more computing devices and/or a computer network associated with the third-party company. The third-party computing device 210 may include one or more computers, servers, and/or databases. The third-party computing device 210 may be associated with a third-party company that is affiliated with the listening device 206. As an example, the third-party computing device 210 and the listening device 206 may provide a connected home (or office) service that enables the user 202 to control one or more home (or office) devices using verbal commands issued to the listening device 206.

The third-party computing device 210 may be communicatively coupled to the listening device 206 via the network 208. Data and other communications may be shared between the third-party computing device 210 and the listening device 206. The third-party computing device 210 may operate to provide one or services (e.g., smart home services) to the user 202 via the listening device 206.

As an example, the user 202 may issue a verbal or audible command to the listening device 205 (e.g., "turn on the patio lights"). The listening device 206 may relay the command from the user 202 to the third-party computing device 210. The third-party computing device 210 may process the received command. The third-party computing device 210 may determine if the command is a command that the user 202 is authorized to request and for the listening device 206 and/or the third-party computing device 210 (or any service provided together by the listening device 206 and/or the third-party computing device 210) to perform. If so, the third-party computing device 210 and/or the listening device 206 may perform the command by causing the command to be performed (e.g., the patio lights may be automatically turned on).

In this manner, the user 202 may be able to access data or services provided by the third-party computing device 210 and may be linked to such data and/or services (including control of local devices within the environment of the user 200) via the listening device 206. The third-party computing device 210 and/or the listening device 206 may coupled to one or more devices within the environment of the user 202 to enable the third-party computing device 210 and/or the listening device 206 to control operation of any coupled device.

The financial institution computing device 212 may be any type of computing device including any computing device depicted and described in relation to FIG. 1. The financial institution computing device 212 may be associated with a financial institution. For example, the financial institution computing device 212 might be a server associated with a particular financial institution. The financial institution computing device 212 may represent one or more computing devices and/or a computer network associated with the financial institution. The financial institution computing device 212 may include one or more computers, servers, and/or databases. The financial institution may be a bank, credit union, credit card company, or any other type of financial institution that may provide one or more financial accounts to an individual or legal entity. In various embodiments, the third-party computing device 210 may be a supporting device that is managed by the financial institution The user 202 associated with the user computing device 204 may have one or more financial accounts with the financial institution associated with the financial institution computing device 212. The user 202 may have a checking account, a savings account, a line of credit, and/or a credit card account provided through the financial institution associated with the financial institution computing device 212. In general, the user 202 associated with the user computing device 204 may have any type of financial account with the financial institution associated with the financial institution computing device 212.

Alternatively, the user 202 may be a malicious actor that seeks access or use of a financial account maintained by the financial institution computing device 212. That is, the user 202 might not be an authorized user of a financial account maintained by the financial institution computing device 212 and may seek to access or use the financial account without authorization or in some other nefarious manner.

As an example, the user 202 may have a financial account with the financial institution associated with the financial institution computing device 212. The financial account may be associated with a payment card of the user 202. The payment card may be any type of card such as, for example, a credit card, a payment card, a debit card, a corporate card, or a prepaid card. The user 202 may conduct transactions (e.g., a first set of transactions) with the financial account using the payment card.

The financial institution computing device 212 may store information related to various financial accounts associated with the user 202 (e.g., data or other information related to various transactions for each financial account associated with the user 202). For example, the financial institution computing device 212 may store transactional data associated with one or more financial accounts the user 202 may have with the financial institution associated with the financial institution computing device 212. The transactional data may include any type of transactional data related to a transaction such as, for example, a date, a time, an amount charged, an amount credited (e.g., an amount refunded), and a merchant name for a transaction. The transactional data may also include stock-keeping unit (SKU) data that may include or may be used to determine an item or service related to a particular transaction (e.g., an item or product purchased during a particular transaction). The transactional data may also include a merchant category code (MCC) for each transaction. Accordingly, as the user 202 conducts transactions related to the financial account of the user 202, the financial institution computing device 212 may collect and store the transactional data associated with the transactions.

The user 202 may use the user computing device 204 to attempt to conduct a financial transaction using (e.g., funded by) the financial account maintained by the financial institution computing device 212 and/or the user 202 may use the user computing device 204 to attempt to access sensitive or secure information related to the financial account maintained by the financial institution computing device 212. Any such attempt by the user 202 may trigger the financial institution computing device 212 to verify or authenticate the user 202 (e.g., to ensure the user 202 is allowed to access the requested information or to have a requested transaction conducted). For example, any such attempt by the user 202 may cause the financial institution computing device 212 to operate to authenticate the identity of the user 202 to ensure the user 202 is indeed the individual associated with the financial account and therefore authorized to perform the requested transaction or to access the requested information.

The financial institution computing device 212 may authenticate the user 202 by generating transaction-based questions (e.g., authentication or authorization questions, or KBA questions). The authentication questions may be based on transactional data associated with the financial account with which the user 202 requests an action to be performed (e.g., a request to perform a transaction and/or a request to access secure information). The authentication question may be considered to be knowledge-based questions as they require the user 202 to be familiar with underlying data (e.g., transactional data related to a financial account) to answer the questions correctly. Accordingly, the authentication process may be considered to be a knowledge-based authentication (KBA) process.

As an example, the user 202 may request an action be performed relating to the financial account associated with the user 202. In response, the financial institution computing device 212 may receive a request for authorization to perform the action relating to the financial account associated with the user 202. The financial institution computing device 212 may generate one or more authentication questions based on transaction data associated with the financial account associated with the user 202.

The one or more authentication questions may be directed to any aspect of any transaction conducted using the financial account associated with the user 202. The financial institution computing device 212 may generate the one or more authentication questions based on transactional data stored by the financial institution computing device 212 (e.g., a database associated with the financial institution computing device 212). As an example, an authentication question may relate to a merchant with which the user 202 has conducted a transaction using the financial account associated with the user 202. The authentication question may ask the user 202 to indicate whether or not the user 202 conducted a transaction with a particular merchant within a particular period of time (e.g., a predetermined period of time prior to the user 202 requesting an action be performed relating to the financial account associated with the user 202). The authentication question may also include or indicate an amount of a transaction or an item or service that may have been purchased. The authentication question may be posed as any type of question including, for example, a true/false (T/F) question, a multiple-choice question, or a yes/no (Y/N) question. The authentication question may be posed in a manner that requests the user 202 to provide an answer. The financial institution computing device 212 may also generate a correct or expected answer to the authentication question.

The authentication question may provide one or more correct answers to the user 202 and/or one or more incorrect or false answers to the user 202. The financial institution computing device 208 may authorize the user 202 (e.g., and/or authorize the request to perform the action relating to the first financial account associated with the user 202) based on the response of the user 202.

As an example, the user 202 may be logged into a financial account through a web-based interface. The user 202 may then request a relatively large sum or amount of funds to be transferred to another financial account maintained by another financial institution. The large transfer request may trigger the financial institution computing device 212 to initiate an authentication process of the user 202. The user 202 may have undergone an initial authentication process to gain online access to the account; however, the large transfer request may trigger a more robust and KBA authentication process. The financial institution computing device 212 may then operate to further authenticate the user 202.

Many conventional authentication processes and systems may generate and rely on non-transaction-based questions. Such conventional authentication systems may be easily circumvented by a malicious actor, as the information relied on to generate the non-transaction-based questions may be information the malicious actor may readily guess or may have access to, allowing the malicious actor to answer the non-transaction-based questions in the same correct manner as the actual authorized user. For example, many conventional authentication systems may authenticate an individual if the individual correctly identifies the maiden name of the individual's mother, the high school mascot of the individual, or correctly identifies some other static information associated with the individual. Reliance on such static information is prone to exploitation by a malicious actor that gains access to such static information associated with an individual.

Additionally, many conventional authentication processes and systems may rely on voice authentication of an individual, but in a manner that may be easily circumvented. For example, many conventional authentication systems may request a voice sample from an individual and may compare the voice sample to a known, stored voice sample of the individual. If the voice samples match, then the individual is authenticated by many such conventional authentication systems. Such conventional authentication systems may be easily circumvented by a malicious actor that has access to a voice recording of the individual. By using the voice recording of the individual, the malicious actor may be able to confuse these conventional authentication systems into deciding that an authorized individual provided the voice sample, thereby mistakenly allowing a malicious actor access to a financial account the malicious actor is not authorized to access or otherwise use.

To provide a more robust authentication process, techniques described herein may authenticate an individual (or authorize an action to be performed) based on a combination of voice analysis and use of transaction-based questions. The financial institution computing device 212 may generate one or more transaction-based questions (e.g., a set of transaction-based questions). The transaction-based questions may be generated based on transactional data stored by the financial institution computing device 212 for a financial account maintained by the financial institution computing device 212. The techniques described herein provide an additional layer of security over the use of transaction-based questions exclusively, by additionally verifying that a voice sample of the user 202 captured when the user 202 provides responses to the transaction-based questions indicates the user 202 is an authorized individual. As such, even if a malicious user has access to prerecorded voice samples corresponding to the voice of a legitimate user, those recordings are unlikely to comprise words or phrases that answer the transaction-based questions. Moreover, even if a malicious user can answer a single transaction-based question using prerecorded voice samples corresponding to the voice of a legitimate user, the likelihood that the malicious user has the ability to answer multiple transaction-based questions using those prerecorded voice samples is quite low.

The transaction-based questions may then be provided or presented to the user 202. The transaction-based questions may be provided or presented to the user 202 in any manner. As an example, the transaction-based questions may be provided or presented to the user 202 one at a time (e.g., such that a first question is presented and answered before a second questions is presented to the user 202), or may be provided or presented to the user 202 in batches (e.g., three questions may be presented and all answered before any additional questions (if at all) are presented to the user 202).

The transaction-based questions may be provided or presented to the user 202 via the user computing device 204. For example, the financial institution computing device 212 may cause the transaction-based questions to presented onto a display screen of the user computing device 204. The transaction-based questions may be provided or presented to the user 202 as one or more text messages or as one or more email messages. The transaction-based questions may be provided or presented to the user 202 via an application (e.g., via a push notification of a smart phone app) that may be provided by the financial institution computing device 212. The transaction-based questions may be provided or presented to the user 202 via a web-based portal maintained by the financial institution computing device 212. Further, transaction-based questions may be provided or presented to the user 202 by a representative of the financial institution via a phone call (e.g., the representative may announce the transaction-based questions for the user 202 to hear and then answer). The transaction-based questions may also be provided or presented to the user 202 via the listening device 206 (e.g., the financial institution computing device 212 may cause the listening device 206 to announce the transaction-based questions. The transaction-based questions may also be provided or presented to the user 202 in a manner that indicates to the user 202 that the user 202 is expected to provided verbal responses to the transaction-based questions.

After being provided or presented the one or more transaction-based questions (e.g., the set of transaction-based questions), the user 202 may provide one or more answers to the one or more transaction-based questions. For example, the user 202 may provide answers to the set of transaction-based questions. The user 202 may engage the listening device 206 to provide the answers. As an example, the user 202 may instruct the listening device 206 to relay the answers to the financial institution that maintains the financial instruction computing device 212.

As a particular example, the user 202 may be presented with three transaction-based questions (e.g., a set or batch of transaction-based questions). The transaction-based questions may be provided to the user 202 by a representative of the financial instruction via a phone call conducted using the user computing device 204. The transaction-based questions may, for example, be: "Where did you buy coffee yesterday?"; "How much did you spend at Bob's Big Box Store last week"; and "What movie theater did you go to last week?" In general, the transaction-based questions may identify an item or service purchased within a predetermined period of time, and may inquire as to where the purchase was made, the amount of the purchase, or a location of the purchase. In response to receiving the set of transaction-based questions, the user 202 may engage the listening device 206 to receive the audible answers of the user 202: "Hey Google. Tell my bank that the answers are Big John's Coffee Shop, over $150, and the cinema on Park Street."

The listening device 206 and/or the third-party computing device 210 may capture a voice sample of the user 202 based on the verbal (or audible) responses provided by the user 202. The voice sample of the user 202 may be used to authenticate or partially authenticate the user 202. The listening device 206 may record the verbal responses of the user 202 and may provide the recording to the third-party computing device 210. The third-party computing device 210 may compare the recording of the verbal responses to one or more known voice samples of an authorized user or owner of the financial account subject to authentication (e.g., a voice print or voice model of the user). The third-party computing device 210 may determine if the voice that provided the audible responses to the set of transaction-based questions is the same voice as an authorized user or owner of the financial account. Alternatively, the listening device 206 may perform such operations to determine if the voice sample and stored voice print match. Under any scenario, the listening device 206 and/or the third-party computing device 210 determine if the voice sample was provided by a valid account owner or user.

If the listening device 206 and/or the third-party computing device 210 determine that the voice sample was provided by a valid account owner or user, then the listening device 206 may provide the recording of the responses to the knowledge-based questions to the financial institution computing device 212. The financial institution computing device 212 may then compare the responses to the transaction-based questions to the correct answers to the transaction-based questions. Based on a certain number of the responses to the transaction-based questions being correct (e.g., based on a number of the responses to the transaction-based questions being correct and meeting or exceeding a predetermined threshold), the financial institution computing device 212 may determine the user 202 is authentic and the requested action may be performed. If the number of correct responses to the transaction-based questions fails to satisfy the predetermined threshold, then the financial institution computing device 212 may determine the user 202 is not authentic and the requested action might not be performed.

The techniques described herein may use a voice print analysis (verification of an individual based on a voice sample of the individual) in conjunction with responses to transaction-based questions to authorize an action/authenticate the individual. The voice print analysis may rely on any number of factors or techniques for comparing a current voice sample or voice print of the user 202 to an expected or known voice sample or voice print of the user 202 such as, for example, similar pronunciation of certain words, similar cadence, similar accent, and/or similar word choice. By relying on voice print analysis in conjunction with responses to transaction-based questions, the techniques described herein might not only enhance security, but may also reduce a total number of transaction-based questions that may be required to be answered by the user 202. In doing so, the experience of the user 202 during the authentication process may be improved as fewer involved questions may require responses, and authentication may occur more quickly.

Further, using a voice sample of an individual that includes the individual's responses to transaction-based questions improves the security and reliability of the voice print analysis provided by the techniques described herein. In many conventional authentication systems, an individual is typically asked to provide a voice sample of a standard phrase or sentence, which may then be compared to the same phrase or sentence known to be voiced by an authorized individual. Such systems may be easily circumvented by a malicious actor that has access to a recording of the individual uttering the standard phrase or sentence. As such, these conventional authentication systems provide very little additional security. In contrast, the techniques described herein verify an individual based on verbal responses to detailed transaction-based questions, preventing a malicious actor from using any recording of another individual to achieve authentication.

The techniques described herein may also allow for dynamic adjustment of the number of transaction-based questions provided or presented to the user 202. That is, the number of transaction-based questions provided or presented to the user 202, or the number of transaction-based questions required for the user 202 to answer correctly, may be dynamically adjusted based on the results of the voice print analysis of the user 202.

In general, if the voice print analysis conducted by the listening device 206 and/or the third-party computing device 210 determines that the provided voice sample (from the user 202 providing responses to the set of transaction-based questions) matches a voice sample previously provided by the user 202 (e.g., a known voice sample of the user 202 or a voice print derived therefrom), then the financial institution computing device 212 may determine that relatively fewer transaction-based questions are required to be asked or that relatively fewer transaction-based questions are required to be answered by the user 202.

Alternatively, if the voice print analysis conducted by the listening device 206 and/or the third-party computing device 210 determines that the provided voice sample (from the user 202 providing responses to the set of transaction-based questions) does not match a voice sample previously provided by the user 202 (e.g., a known voice sample of the user 202 or a voice print derived therefrom)), then the financial institution computing device 212 may determine that relatively more transaction-based questions are required to be asked or that relatively more transaction-based questions are required to be answered by the user 202.

As an example, the financial institution computing device 212 may require ten (10) transaction-based questions to be answered correctly by the user 202 before the financial institution computing device 212 determines that the user 202 is authenticated. When voice print analysis of the user 202 is conducted as part of the authentication process, then the number of correctly-answered questions may be lowered. For example, if the voice print analysis results in a determination that the voice sample matches a known voice print for an individual, then the financial institution computing device 212 may reduce the number of transaction-based questions to be answered correctly by the user 202 from ten (10) to five (5). In contrast, if the voice print analysis results in a determination that the voice sample does not match a known voice print of the individual, then the financial institution computing device 212 may increase the number of transaction-based questions to be answered correctly by the user 202 from ten (10) to fifteen (15).

In general, the financial institution computing device 212 may set a threshold (e.g., a number of correctly-answered questions threshold) that indicates or specifies the number of transaction-based questions that must be answered correctly by the user 202 in order for the user 202 to be authenticated. The threshold may be dynamically adjusted based on the results of the voice print analysis conducted in relation to the user 202.

Overall, the techniques described herein for authenticating the user 202 may be dynamically adjusted to account for the user 202 providing or not providing a voice sample or voice print that matches an expected voice print for the user 202. The techniques described herein may allow under certain circumstances for the user 202 to be authenticated even if it is determined that the voice sample or voice print does not match an expected voice print for the user 202 (e.g., when the user 202 answers an increased number of transaction-based questions correctly). The techniques described herein may allow under certain circumstances for the user 202 to not be authenticated even if it is determined that the voice sample or voice print matches an expected voice print for the user 202 (e.g., when the user 202 fails to answer a certain number of transaction-based questions correctly).

As part of the voice print analysis conducted by the listening device 206 and/or the third-party computing device 210, a confidence score may be generated. The confidence score may indicate a likelihood that the voice sample provided by the user 202 when responding to the transaction-based questions matches a known voice print of the user 202 (e.g., a stored, known voice sample, or expected voice print of the user 202, used for comparison). A confidence score of greater than 50 may indicate that the user 202 is likely the individual that provided the stored, known voice sample (i.e., that the current and expected voice prints match). A confidence score of less than 50 may indicate that the user 202 is not likely the individual that provided the stored, known voice sample (i.e., that the current and expected voice prints do not match).

If the confidence score is less than 50, then the listening device 206 might notify the confidence score of less than 50 to the financial instruction computing device 212 and might not provide the responses of the user 202 to the financial instruction computing device 212. Under such a scenario, the listening device 206 (e.g., under direction of the financial instruction computing device 212) may indicate to the user 202 that authorization has been denied. If the confidence score is greater than 50, then the listening device 206 might notify the confidence score of more than 50 to the financial instruction computing device 212 and may provide the responses of the user 202 to the financial instruction computing device 212.

Under such a scenario, the listening device 206 (e.g., under direction of the financial instruction computing device 212) may indicate to the user 202 that authorization is pending as the financial instruction computing device 212 conducts further authentication of the user 202 based on the responses of the user 202 to the transaction-based questions. Overall, the confidence score may be used by the financial instruction computing device 212 to increase or decrease the threshold number of questions the user 202 much answer correctly. Any confidence score value or threshold may be used to trigger the operations described herein.

The techniques described herein enable a voice print of the user 202 to be developed or generated based on the audible responses of the user 202 to one or more transaction-based questions. The voice print of the user 202 may be a raw voice sample or may be derived by processing a raw voice sample. The voice print of the user 202 may then be compared to an expected voice print of the user 202. The expected voice print of the user 202 may developed based on one or more voice samples of the user 202—for example, based on prior voice samples collected from the user 202 during prior authentication processes. The expected voice print of the user 202 may be modified over time based on prior voice samples.

The techniques described herein enable the user 202 to configure the listening device 206 to be able to interact with the financial institution computing device 212. The user 202 may configure the listening device 206 to access information associated with one or more financial accounts of the user via the financial institution computing device 212. This may allow the user 202 to conduct operations related to one or more financial accounts of the user 202 through interaction with the listening device 206. Further, this may enable the listening device 206 and/or the financial institution computing device 212 to compare a voice print of the user 202 based on audible response of the user 202 to one or more transaction-based questions to an expected voice print of the user 202. As an example, a user 202 may be able to configure the listening device 206 to interact with the financial institution computing device 212 to answer questions posed by the user such as "When is the payment due date for my credit card?" or "What is my checking account balance?".

Discussion will now turn to an example method for authenticating a user with transaction-based authentication questions and voice print analysis in accordance with the techniques described herein.

Figure 3:
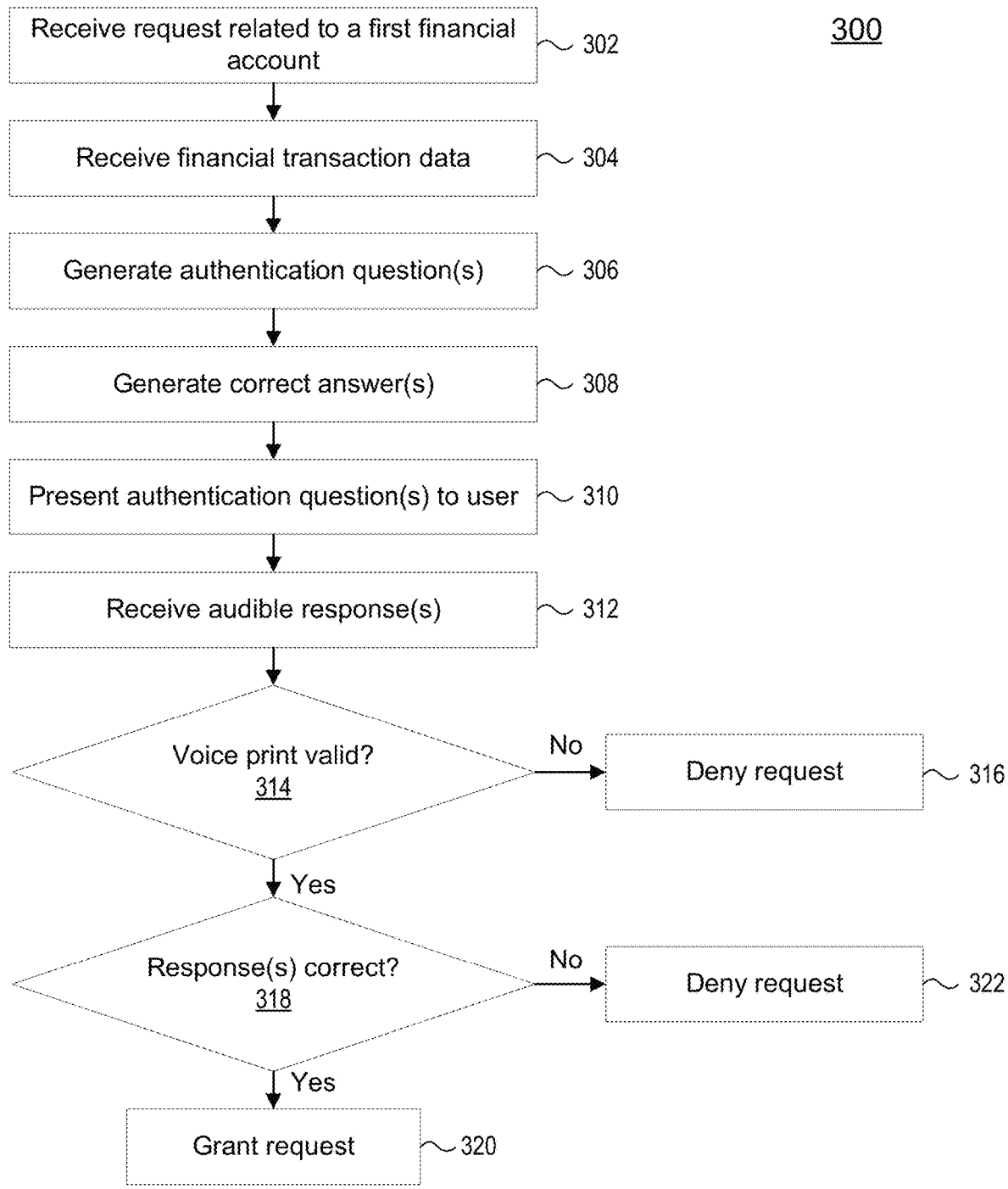
FIG. 3 illustrates an example method for relaying responses to transaction-based authentication questions using a smart device.

FIG. 3 illustrates an example method 300 for relaying responses to transaction-based authentication questions using a listening device. Authentication questions for authenticating a user may be generated based on financial transaction data associated with a financial account. The user may provide verbal or audible responses to the authentication questions. A listening device may receive the verbal or audible responses. The listening device and/or an associated remote computing device may perform a voice print analysis of audible responses from the user as a first check as to whether the user that provided the responses is an authorized user. The user may be authenticated or not based on results of the voice print analysis and/or based on the responses to the authentication questions.

Method 300 may be implemented by a suitable computing system and/or any combination of computing systems or devices, as described herein. For example, method 300 may be implemented in any suitable computing environment by a computing device and/or combination of computing devices, such as computing devices 101, 105, 107, and 109 of FIG. 1 and/or by any one or more of the components depicted in any of FIG. 2 such as, for example, the user computing device 204, the listening device 206, the third-party computing device 210, or the financial institution computing device 212, or any combination thereof. Method 300 may be implemented in suitable program instructions, such as in software 127, and may operate on data, such as data 129.

At step 302, a request for authorization to perform an action relating to a financial account may be received. The request may be initiated by a user. The user may be any individual including, for example, an owner, authorized user, or account holder associated with the financial account. Alternatively, the user might not be an authorized user of the financial account and may be a malicious actor. The action may comprise conducting a financial transaction using the financial account. The action may comprise accessing secure information relating to the financial account. The action may comprise accessing funds of the financial account. The financial account may be any type of account such as, for example, a personal financial account.

At step 304, financial data relating to the financial account of the user may be received. The financial data may be received from one or more databases, such as from all or portions of the financial institution computing device 212. The financial data may include any information related to any transaction conducted using the financial account. The financial data may over any predetermined period of time.

At step 306, one or more authorization questions for determining whether to perform the action relating to the financial account may be generated. The one or more authorization questions may be generated based on the financial data. The one or more authorization questions may be transaction-based questions relating to the financial account. Authorization questions may be generated one at a time as needed or may be generated in sets or batches. As an example, at step 306, a first number of authorization questions may be generated, with the first number be equal to any value such as 10.

At step 308, correct answers to the one or more authorization questions may be generated. The correct answers may be generated based on the financial data and the one or more authorization questions. As with generation of the authorization questions, the correct answers may be generated one at a time as needed or may be generated in sets or batches, corresponding to generation of the one or more authorization questions. As an example, at step 308, a first number of correct answers may be generated, with the first number be equal to any value such as 10, to correspond to the amount of authorization questions generated.

At step 310, the one or more authorization question may be presented to the user. The one or more authorization questions may be presented to the user in any manner. For example, the one or more authorization questions may be provided verbally by a customer service representative (e.g., over a telephone connection) or may be audibly announced by a listening device (e.g., the listening device 106). The authorization may also be caused to be displayed to the user (e.g., on a display of a computing device of the user). The authorization question may be any type of transaction-based question regarding the financial data including, for example, a question whether the user conducted a particular transaction at a particular merchant within a particular time period. The authentication question may include a request to indicate whether the account holder conducted a transaction with a particular merchant, if the account holder authorized a particular transaction with a particular merchant, or the amount of a particular transaction. The authorization question may also include a set of answer choices with one or more correct answers and/or one or more incorrect answers. The authorization question may prompt the user to answer the authorization question.

As an example, at step 306, a first number of authentication questions may be generated. At step 308, a corresponding first number of correct answers may be generated. At step 310, a subset of the first number of authentication questions may be presented or provided to the user. The subset of authentication questions may be less than the first number of authentication questions, such that less than all authorization questions generated at step 306 are presented or provided to the user. The subset of authentication questions may be considered a first batch or first set of authentication questions. The authentication questions not included in the first set of authenticate questions may be held back and used later or might not be used at all as described further herein. As an example, out of the 10 authentication questions generated, 5 may be presented to the user for the user to provide responses.

At step 312, responses to the one or more authorization questions may be received. The response may be received as a verbal and/or audible response. The user may engage a listening device (e.g., the listening device 206). By engaging the listening device, the user may cause the listening device to receive the user's responses. Further, the listening device may determine or may be informed by the user that the user's responses are associated with a financial institution. The listening device may record and store the user's responses. The listening device may generate one or more files that contains audio data that include the user's responses. The listening device may provide the user's responses to a remote computing device associated with the listening device (e.g., the third-party computing device 210). The remote computing device associated with the listening device may receive and/or store one or more files containing audio data that comprise the user's responses.

The listening device and/or the remote computing device associated with the listening device may generate one or more files containing the user's responses as raw data, such as textual versions of the user's responses. As an example, the listening device and/or the remote computing device associated with the listening device may receive the user's responses as audio data and may store the audio data. The listening device and/or the remote computing device associated with the listening device may use audio-to-text software or other techniques to parse the audio data to discern and store data indicating the user's responses.

For example, the listening device and/or the remote computing device associated with the listening device may store a first file containing audio data of the user's responses, such as, for example, an audio file that contains the user saying aloud: "Hey Google. Tell my bank that the answers are Big John's Coffee Shop, over $150, and the cinema on Park Street." Based on this collected audio information, the listening device and/or the remote computing device associated with the listening device may generate a second file that includes the raw answers of the user as data (e.g., textual or other data, non-audio data). For example, the second file may contain data indicating the responses of the user to be: Big John's Coffee Shop; over $150; the cinema on Park Street.

At step 314, a voice print analysis of the user may be conducted or performed. The voice print analysis may be performed by the listening device and/or the remote computing device associated with the listening device. The voice print analysis may compare the audible responses of the user to the authentication questions to a voice print for the user. As an alternative to a voice print, one or more stored voice samples of an authorized user may be used for comparison, or the audible responses of the user may be compared to a voice model of the user. Under any scenario, the audible responses of the user may be analyzed to determine if the audible responses of the user match (or likely match) the voice of an authorized user, thereby indicating that the user that provided the audible responses is indeed an authorized user of the financial account. Accordingly, at step 314, a determination is made whether the voice sample from the user is valid—i.e., matches or likely matches the voice of the authorized user.

If a determination is made at step 314 that the voice sample from the user is not valid—i.e., does not match or likely does not match the voice of the authorized user (e.g., an expected voice print of the user)—then the request for authorization might not be granted at step 316. Further, at step 316, the listening device and/or the remote computing device associated with the listening device might not forward the user's responses (either as audio data or other data, including the first and/or second files described herein) to any other computing device (e.g., the financial institution computing device 212) for analysis.

If a determination is made at step 314 that the voice sample from the user is valid—i.e., does match or likely does match the voice of the authorized user (e.g., an expected voice print of the user)—then the responses of the user to the authorization questions may be compared to the correct answers at step 318. If the responses match the correct answers, then at step 320, the request for authorization may be granted. If the responses do not match the correct answer, then at step 322, the request for authorization might not be granted. In this manner, a determination whether to grant the request for authorization to perform the action relating to the financial account may be based on the results of a voice print analysis of the user and the user's response to the authorization questions.

The method 300 may include handling of the determination that the voice sample of the user is valid or not valid at step 314 in a number of ways. For example, if the voice sample of the user is determined to be valid at step 314, then the user might not be required to provide correct responses to each of the authentication questions presented to the user at step 310. As a specific example, 5 of 10 generated authentication questions may be presented to the user at step 310. If the voice sample of the user is determined to be valid at step 314, then the request for authorization may be granted from step 318 if the user provides correct answers to 3 out of the 5 authorization questions (e.g., only 3 transaction-based questions may be presented and if answered correctly no more are presented). As such, a threshold number of correct responses to the authorization questions may be dynamically lowered based on the determination that the voice sample of the user is valid.

If the voice sample of the user is determined to be not valid at step 314, then the request for authorization may still be granted under certain circumstances. For example, the request for authorization may be granted if the user provides correct responses to all 10 of the generated authentication questions. As a specific example, the request for authorization may be granted if the user provides correct responses to the first set of authorization questions (e.g., the first 5 out of 10 authentication questions) and then also provides correct responses to a second set of authorization questions (e.g., correct responses to the second 5 out of 10 authentication questions). Under such a scenario, steps 310 and 312 may be repeated after step 314 instead of implementing step 316. In this manner, a threshold number of correct responses to the authorization questions may be dynamically increased based on the determination that the voice sample of the user is not valid.

Discussion will now turn to an example method for modifying a number of authentication questions to be answered correctly during an authentication process based on results of a voice print analysis in accordance with the techniques described herein.

Figure 4:
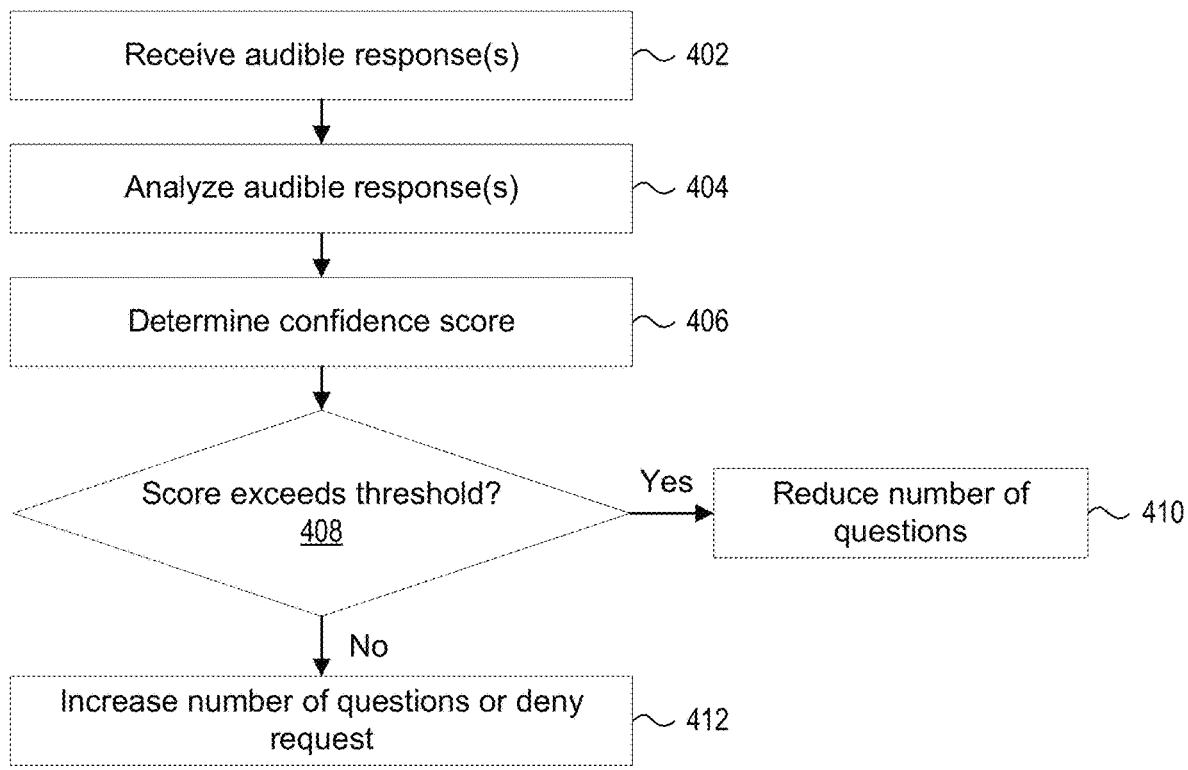
FIG. 4 illustrates an example method for modifying an authentication process based on the results of a voice print analysis.

FIG. 4 illustrates an example method 400 for modifying an authentication process based on the results of a voice print analysis. Authentication questions for authenticating a user may be generated based on financial transaction data associated with a financial account. The user may provide verbal or audible responses to the authentication questions. A listening device may receive the verbal or audible responses. The listening device and/or an associated remote computing device may perform a voice print analysis of audible responses from the user. Based on the results of the voice print analysis, a number of authentication questions required to be answered correctly may be adjusted (e.g., increased or decreased) as described herein.

Method 400 may be implemented by a suitable computing system and/or any combination of computing systems or devices, as described herein. For example, method 400 may be implemented in any suitable computing environment by a computing device and/or combination of computing devices, such as computing devices 101, 105, 107, and 109 of FIG. 1 and/or by any one or more of the components depicted in any of FIG. 2 such as, for example, the user computing device 204, the listening device 206, the third-party computing device 210, or the financial institution computing device 212, or any combination thereof. Method 400 may be implemented in suitable program instructions, such as in software 127, and may operate on data, such as data 129. Method 400 may represent a portion of method 300 or may be implemented in conjunction with method 300. Further, any portion of method 400 may be combined with any portion of method 300.

At step 402, audible responses to one or more authentication questions posed to a user may be received. Step 402 may correspond to step 312 of method 300. The audible responses may be received by a listening device (e.g., the listening device 206 of FIG. 2). The audible responses to the one or more authentication questions posed to the user may be considered to be a voice sample of the user.

At step 404, the voice sample may be analyzed or processed. The voice sample may be compared to a voice print of the user. The voice sample may be compared to a stored, valid voice sample of the user (e.g., a prior provided voice sample known to originate from the user). The voice sample may be compared to a voice model of the user. The voice model may be unique to the user. The voice sample may be compared to a voice print of the user. The voice print of the user may be an expected voice print of the user that may be derived based on one or more voice samples provided the user (e.g., voice samples collected from one or more authentication processes). The expected voice print of the user may be generated or derived based on user vice samples, and may represent more than a raw recorded voice sample of the user.

At step 404, the voice sample may be analyzed or processed to determine how likely the voice sample was provided from an authorized user (e.g., that the voice sample did indeed originate from an authorized user who provided the voice sample). The voice sample may be analyzed or provided to a machine learning (ML) model that may be trained, based on voice samples from the authorized user, to detect the voice of the authorized user.

The listening device 206 and/or the financial institution computing device 212 may determine, in whole or in part, whether the voice sample was provided by the authorized user using machine learning techniques. A machine learning model (e.g., executing via the machine learning software 127 and/or the deep neural network 500 of FIG. 5 discussed further herein) may be trained to identify the voice of the authorized user (or to determine a likelihood that a voice sample was provided by a particular authorized user) based on training data that indicates different voice samples of the authorized user.

At step 406, a confidence score may be determined. The confidence score may be a numerical value and may be associated with a scale or range of possible scores for the confidence score. The confidence score may indicate a likelihood that the voice sample is valid—i.e., provided by an authorized user. A relatively low confidence score may indicate that the voice sample was unlikely provided by the authorized user. A relatively high confidence score may indicate that the voice sample was likely provided by the authorized user.

At step 408, the confidence score may be compared to a predetermined threshold. The threshold may be set to any value. As an example, the confidence score and the threshold may be expressed as a percentage. The threshold may be set to be 50%. A confidence score of, for example, 60% would satisfy the threshold (e.g., exceed the threshold or be greater than the threshold) and would indicate that the voice sample is likely provided by the authorized user. On the other hand, a confidence score of, for example, 40% would not satisfy the threshold (e.g., not exceed the threshold or be less than the threshold) and would indicate that the voice sample is not likely provided by the authorized user.

If the confidence score is determined to exceed the threshold at step 408, then at step 410, a number of authentication questions required for the user to answer correctly to be authenticated may be reduced or lowered. If the confidence score is determined to not exceed the threshold at step 408, then at step 412, the number of authentication questions required for the user to answer correctly to be authenticated may be increased. The number of authentication questions required to be answered correctly may be increased or decreased by a default number of questions, which may be any number or value. At step 412, instead of requiring an increased number of authentication questions to be answered correctly for authentication, it may be determined that authorization cannot be granted.

Any of the techniques described herein for generating authentication questions may be implemented within a call center environment. For example, the user 202 may use a landline telephone or cellphone to call a call center (or may receive a call from a call center) to effectuate authentication. A call center representative may read an authentication question (including any answer choices) to the user 202 (or an authentication question may be displayed on a device used by the user). The steps described above in relation to FIGS. 3 and 4 may be performed in any manner.

The techniques described herein further enable an expected voice print of a user to be modified (e.g., updated or improved) with each authentication of the user. For example, when a voice sample of the user (e.g., provided when answering one or more transaction-based questions) is determined to be provided by an authorized user, the provided voice sample may be used to refine or improve an expected voice print or voice model of the user. In this manner, the ability to authenticate a voice sample of the user may be improved with each success authentication of the user, to improve the likelihood that a user's voice is properly recognized (or to improve the likelihood that the voice of an authorized user is not determined to be the voice of an authorized user), thereby improving security and reliability.

Figure 5:
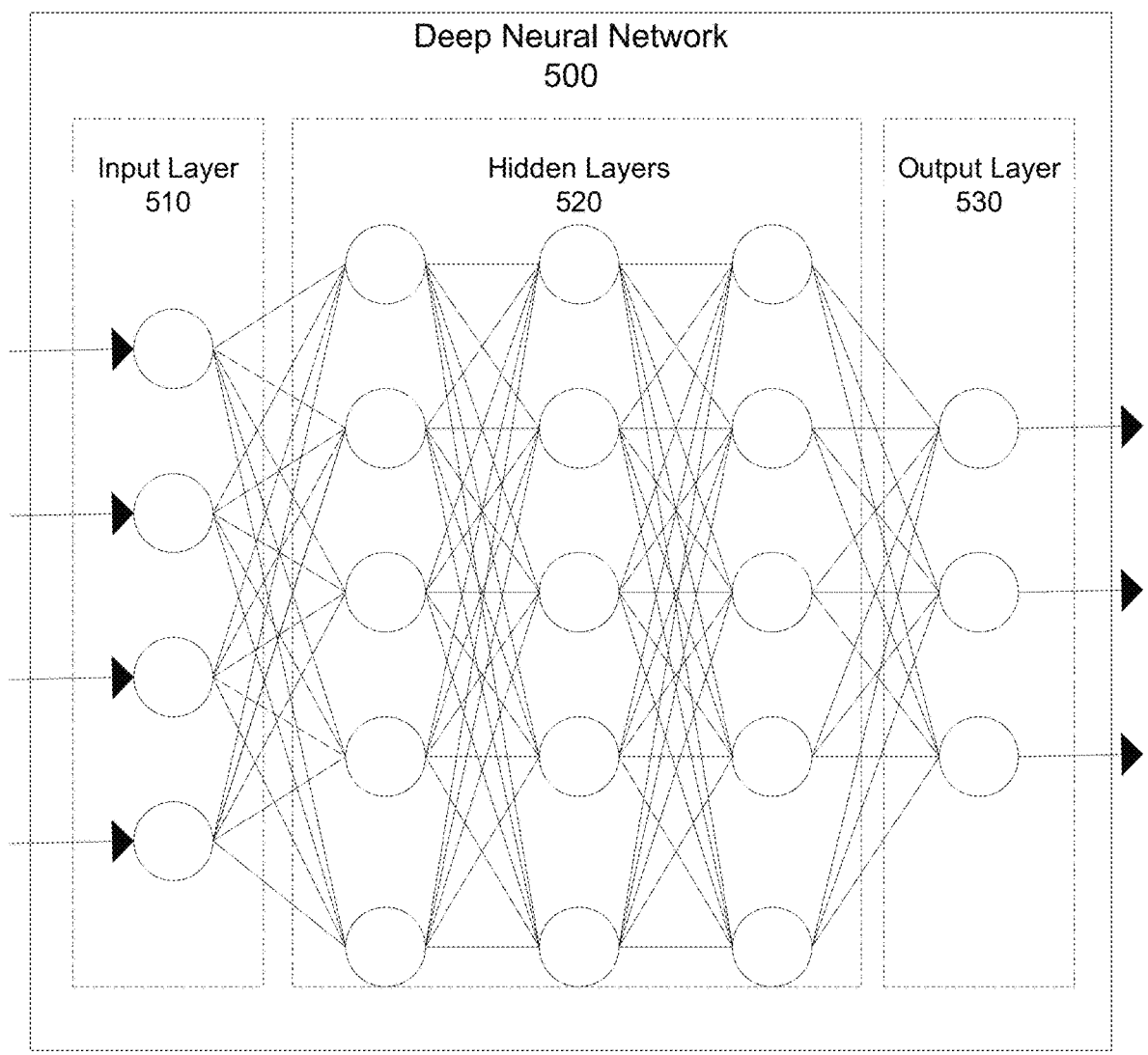
FIG. 5 depicts an example deep neural network architecture for a model according to one or more aspects of the disclosure.

FIG. 5 illustrates an example deep neural network architecture 500. Such a deep neural network architecture may be all or portions of the machine learning software 127 shown in FIG. 1. That said, the architecture depicted in FIG. 5 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 510, one or more hidden layers 520, and an output layer 530. A deep neural network, as used herein, may be an artificial network that has more than one hidden layer. Illustrated network architecture 500 is depicted with three hidden layers, and thus may be considered a deep neural network. The number of hidden layers employed in deep neural network 500 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model. The deep neural network architecture 500 may be used in processes for authenticating a user—for example, by facilitating a determination of whether or not a user is an authorized user based on a provided voice sample from an individual.

The techniques described herein for authenticating a user provide enhanced reliability and security, by combining voice authentication techniques with transaction-based questions techniques. By determining whether an individual that provided one or more answers to one or more corresponding transaction-based questions is likely an authorized user based on a voice print analysis of one or more audible answers provided by the individual, authentication techniques described herein may provide an additional layer of security beyond just comparing the individual answers to correct answers. Further, the experience of the user may be improved as authentication may be effectuated by requiring the individual to answer fewer transaction-based questions when the individual's voice has been verified, as compared to any required number of transaction-based questions to be answered when no voice print analysis is conducted. This ensures that individuals authenticated based on techniques described herein find the experience to be simple and effective, and less cumbersome and time-consuming than conventional authentication techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   receiving, by a computing device, a request for authorization to perform an action relating to a financial account;
   generating, by the computing device and based on financial transaction data relating to the financial account, a set of authorization questions required to be answered correctly to grant the request for authorization to perform the action relating to the financial account;
   providing, by the computing device, a first authorization question of the set of authorization questions to a user;
   receiving, by the computing device, from the user, and via a listening device, an audible response to the first authorization question;
   determining, by the computing device, a voice print of the user based on the audible response to the first authorization question;
   training, based on a plurality of voice samples collected from the user during a corresponding plurality of prior authentication processes, a machine learning model to identify a voice of the user;
   comparing, by the computing device, the voice print of the user to an expected voice print of the user, wherein the expected voice print of the user is generated by the computing device based on the plurality of voice samples collected from the user during the corresponding plurality of prior authentication processes;
   determining, by the computing device, based on the trained machine learning model, and based on comparing the voice print of the user to the expected voice print of the user, a confidence score indicating a likelihood that the user is an authorized user of the financial account;
   modifying, by the computing device and based on comparing the confidence score to a predetermined threshold, a size of the set of authorization questions required to be answered correctly to grant the request for authorization to perform the action relating to the financial account
   comparing the audible response to the first authorization question to a first correct answer of a set of correct answers to the set of authorization questions; and
   granting the request for authorization based on the audible response to the first authorization question matching the first correct answer and based on the voice print of the user matching the expected voice print of the user.

2. The method of claim 1, wherein modifying the size of the set of authorization questions comprises reducing the size of the set of authorization questions based on the confidence score satisfying the predetermined threshold.

3. The method of claim 1, wherein modifying the size of the set of authorization questions comprises increasing the size of the set of authorization questions based on the confidence score not satisfying the predetermined threshold.

4. The method of claim 1, further comprising modifying, by the computing device and based on the audible response to the first authorization question, the expected voice print of the user.

5. The method of claim 1, further comprising:
   storing, by the computing device, in a first electronic file, and as audio data, the audible response to the first authorization question.

6. The method of claim 5, further comprising:
   generating, by the computing device, via audio-to-text software, and based on the audio data in the first electronic file, a second electronic file comprising textual data corresponding to the audible response to the first authorization question; and comparing the textual data corresponding to the audible response to the first authorization question to the first correct answer of the set of correct answers to the set of authorization questions.

7. The method of claim 1, wherein the action comprises one or more of:
accessing funds of the financial account; or
accessing secure information relating to the financial account.

8. An apparatus comprising:
one or more processors; and
memory storing instructions that, when executed by the one or more processors, cause the apparatus to:
receive a request for authorization to perform an action relating to a financial account;
generate, based on financial transaction data relating to the financial account, a set of authorization questions required to be answered correctly to grant the request for authorization to perform the action relating to the financial account;
provide a first authorization question of the set of authorization questions to a user;
receive, from the user, and via a listening device, an audible response to the first authorization question;
determine, a voice print of the user based on the audible response to the first authorization question;
train, based on a plurality of voice samples collected from the user during a corresponding plurality of prior authentication processes, a machine learning model to identify a voice of the user;
compare, the voice print of the user to an expected voice print of the user, wherein the expected voice print of the user is generated by based on the plurality of voice samples collected from the user during the corresponding plurality of prior authentication processes;
determine, based on the trained machine learning model, and based on comparing the voice print of the user to the expected voice print of the user, a confidence score indicating a likelihood that the user is an authorized user of the financial account;
modify, based on comparing the confidence score to a predetermined threshold, a size of the set of authorization questions required to be answered correctly to grant the request for authorization to perform the action relating to the financial account compare the audible response to the first authorization question to a first correct answer of a set of correct answers to the set of authorization questions; and
grant the request for authorization based on the audible response to the first authorization question matching the first correct answer and based on the voice print of the user matching the expected voice print of the user.

9. The apparatus of claim 8, the memory storing instructions that, when executed by the one or more processors, further cause the apparatus to modify the size of the set of authorization questions by reducing the size of the set of authorization questions based on the confidence score satisfying the predetermined threshold.

10. The apparatus of claim 8, the memory storing instructions that, when executed by the one or more processors, further cause the apparatus to modify the size of the set of authorization questions by increasing the size of the set of authorization questions based on the confidence score not satisfying the predetermined threshold.

11. The apparatus of claim 8, the memory storing instructions that, when executed by the one or more processors, further cause the apparatus to modify, based on the audible response to the first authorization question, the expected voice print of the user.

12. The apparatus of claim 8, the memory storing instructions that, when executed by the one or more processors, further cause the apparatus to store, in a first electronic file, and as audio data, the audible response to the first authorization question.

13. The apparatus of claim 12, the memory storing instructions that, when executed by the one or more processors, further cause the apparatus to:
generate, via audio-to-text software, and based on the audio data in the first electronic file, a second electronic file comprising textual data corresponding to the audible response to the first authorization question; and
compare the textual data corresponding to the audible response to the first authorization question to the first correct answer of the set of correct answers to the set of authorization questions.

14. The apparatus of claim 8, wherein the action comprises one or more of:
accessing funds of the financial account; or
accessing secure information relating to the financial account.

15. One or more non-transitory media storing instructions that, when executed by one or more processors, cause the one or more processors to perform steps comprising:
receive a request for authorization to perform an action relating to a financial account;
generate, based on financial transaction data relating to the financial account, a set of authorization questions required to be answered correctly to grant the request for authorization to perform the action relating to the financial account;
provide a first authorization question of the set of authorization questions to a user;
receive, from the user, and via a listening device, an audible response to the first authorization question;
determine, a voice print of the user based on the audible response to the first authorization question;
train, based on a plurality of voice samples collected from the user during a corresponding plurality of prior authentication processes, a machine learning model to identify a voice of the user;
compare, the voice print of the user to an expected voice print of the user, wherein the expected voice print of the user is generated based on the plurality of voice samples collected from the user during the corresponding plurality of prior authentication processes;
determine, based on the trained machine learning model, and based on comparing the voice print of the user to the expected voice print of the user, a confidence score indicating a likelihood that the user is an authorized user of the financial account;
modify, based on comparing the confidence score to a predetermined threshold, a size of the set of authorization questions required to be answered correctly to grant the request for authorization to perform the action relating to the financial account
compare the audible response to the first authorization question to a first correct answer of a set of correct answers to the set of authorization questions; and grant the request for authorization based on the audible response to the first authorization question matching the first correct answer and based on the voice print of the user matching the expected voice print of the user.

16. The one or more non-transitory media of claim 15, wherein the instructions, when executed, cause the one or more processors to modify the size of the set of authorization questions by reducing the size of the set of authorization questions based on the confidence score satisfying the predetermined threshold.

17. The one or more non-transitory media of claim 15, wherein the instructions, when executed, cause the one or more processors to modify the size of the set of authorization questions by increasing the size of the set of authorization questions based on the confidence score not satisfying the predetermined threshold.

18. The one or more non-transitory media of claim 15, wherein the instructions, when executed, cause the one or more processors to modify, based on the audible response to the first authorization question, the expected voice print of the user.

19. The one or more non-transitory media of claim 15, wherein the instructions, when executed, cause the one or more processors to store, in a first electronic file, and as audio data, the audible response to the first authorization question.

20. The one or more non-transitory media of claim 15, wherein the action comprises one or more of:
   accessing funds of the financial account; or
   accessing secure information relating to the financial account.

* * * * *